(12) United States Patent
Cox et al.

(10) Patent No.: US 11,548,392 B2
(45) Date of Patent: Jan. 10, 2023

(54) METHODS AND SYSTEM FOR IMPROVING OPERATION OF A VEHICLE ELECTRIC POWER DISTRIBUTION BUS

(71) Applicant: Ford Global Technologies, LLC, Dearborn, MI (US)

(72) Inventors: David Cox, London (GB); Edward Ball, London (GB); Aaron Walker, Auburn Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 9 days.

(21) Appl. No.: 17/169,077

(22) Filed: Feb. 5, 2021

(65) Prior Publication Data
US 2022/0250480 A1   Aug. 11, 2022

(51) Int. Cl.
*B60L 3/00* (2019.01)
*H02M 7/00* (2006.01)
*B60R 16/023* (2006.01)
*H01R 25/16* (2006.01)
*H02M 1/15* (2006.01)

(52) U.S. Cl.
CPC ............. *B60L 3/0069* (2013.01); *B60L 3/003* (2013.01); *B60R 16/0238* (2013.01); *H01R 25/161* (2013.01); *H02M 1/15* (2013.01); *H02M 7/003* (2013.01)

(58) Field of Classification Search
None
See application file for complete search history.

(56) References Cited

U.S. PATENT DOCUMENTS

| | | | |
|---|---|---|---|
| 10,189,357 B2 | 1/2019 | Zou et al. | |
| 2013/0147412 A1* | 6/2013 | Solodovnik | B60R 16/03 361/18 |
| 2013/0234675 A1 | 9/2013 | King et al. | |
| 2018/0236882 A1* | 8/2018 | Wang | B60L 50/51 |
| 2020/0298722 A1 | 9/2020 | Smolenaers | |

\* cited by examiner

*Primary Examiner* — Jared Fureman
*Assistant Examiner* — Aqeel H Bukhari
(74) *Attorney, Agent, or Firm* — David Kelley; McCoy Russell LLP

(57) ABSTRACT

Systems and methods for operating an electric power distribution bus of an electric or hybrid vehicle are described. In one example, an output of an electric power consumer is decoupled from other electric power consumers so that electric current drawn from the electric power distribution bus is lowered while the electric power consumer provides a capacitive load to the electric power distribution bus, thereby reducing voltage ripple associated with the electric power distribution bus.

20 Claims, 5 Drawing Sheets

US 11,548,392 B2

METHODS AND SYSTEM FOR IMPROVING OPERATION OF A VEHICLE ELECTRIC POWER DISTRIBUTION BUS

FIELD

The present description relates to methods and a system for improving operation of a vehicle's electric power distribution bus.

BACKGROUND AND SUMMARY

A vehicle may include an electric power distribution bus. The bus may deliver electric power from a power source to a power consumer. The electric power that is distributed by the electric power distribution bus may be comprised of a voltage and an electric current. It may be desirable for the voltage to remain constant so that power consumers that are sensitive to voltage may operate as expected. However, if the voltage of the electric power distribution bus varies by more than a predetermined amount, degradation of electric power consumers that are electrically coupled to the electric power distribution bus may occur.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
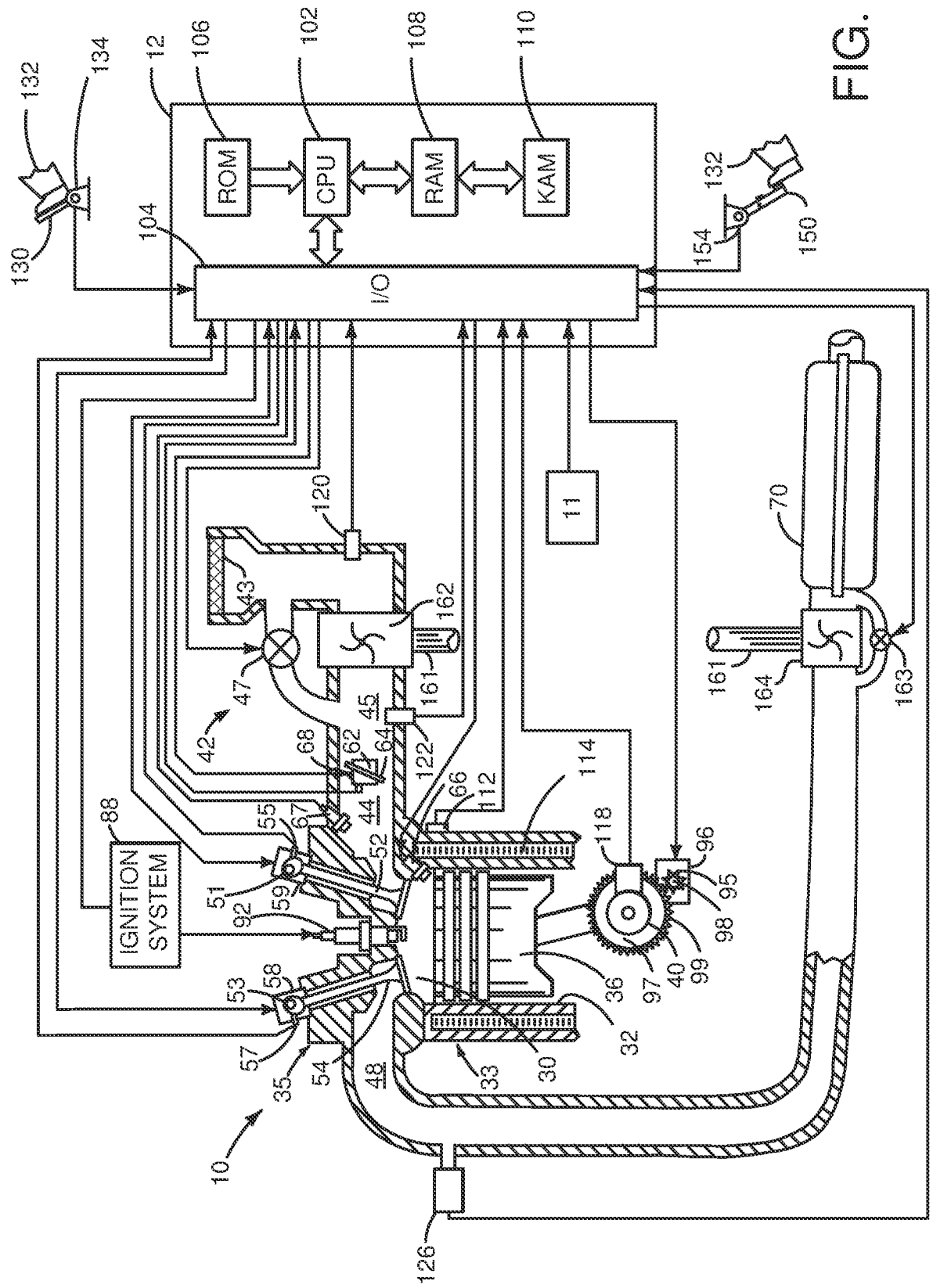
FIG. 1 is a schematic diagram of an engine.
Figure 2:
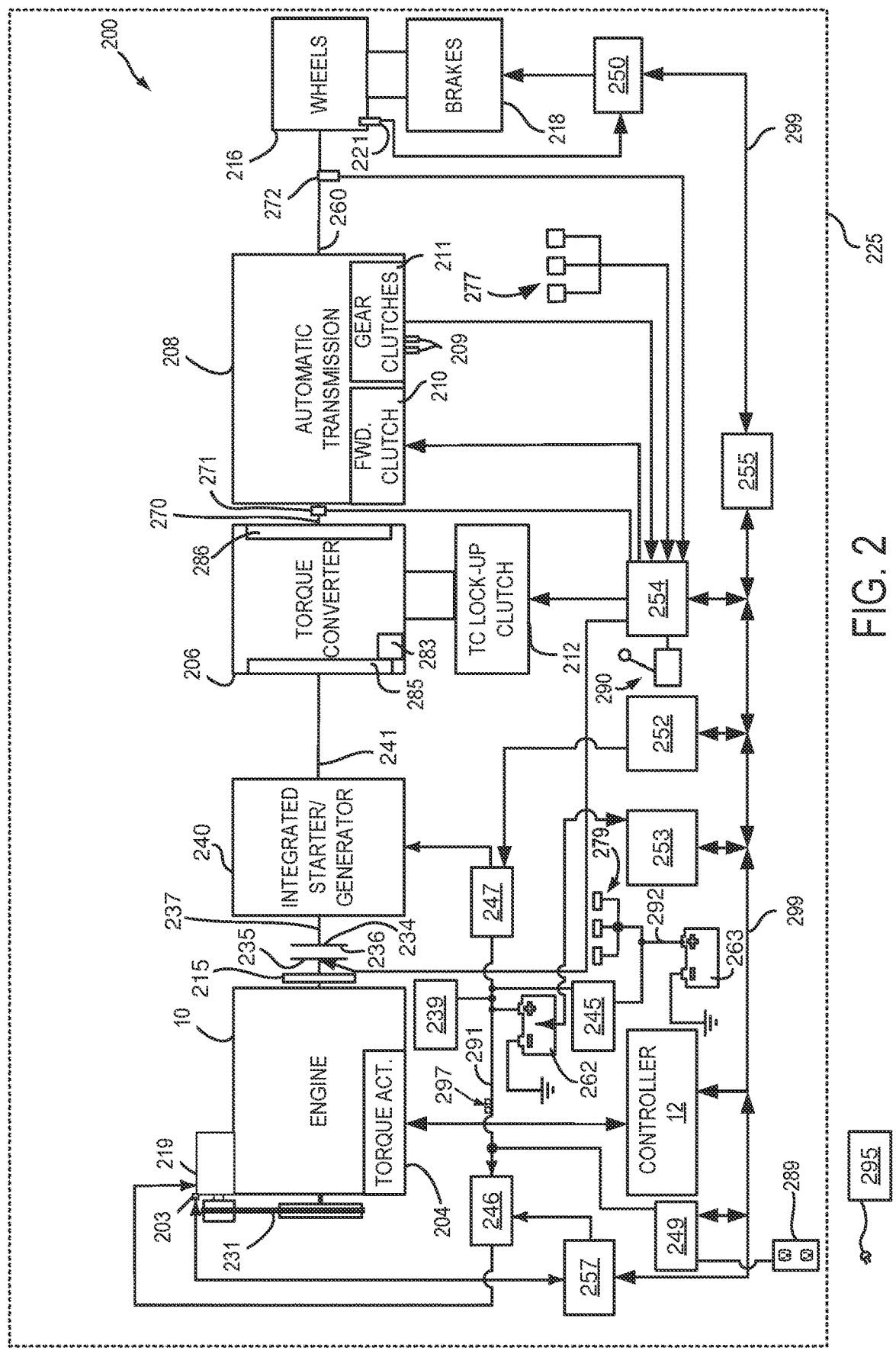
FIG. 2 is a schematic diagram of a vehicle driveline.
Figure 3:
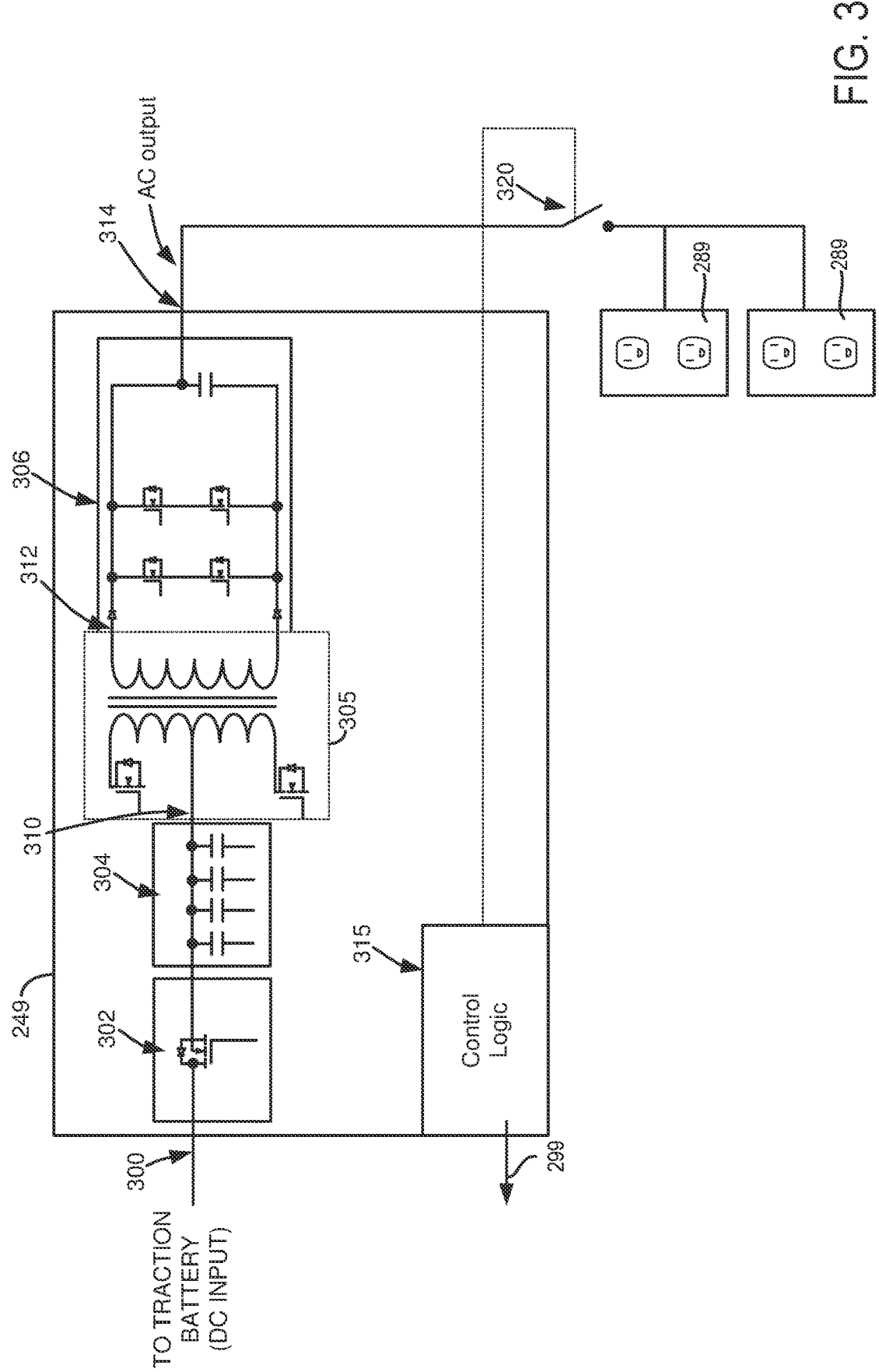
FIG. 3 shows a diagram of an example electric power consumer.
Figure 4:
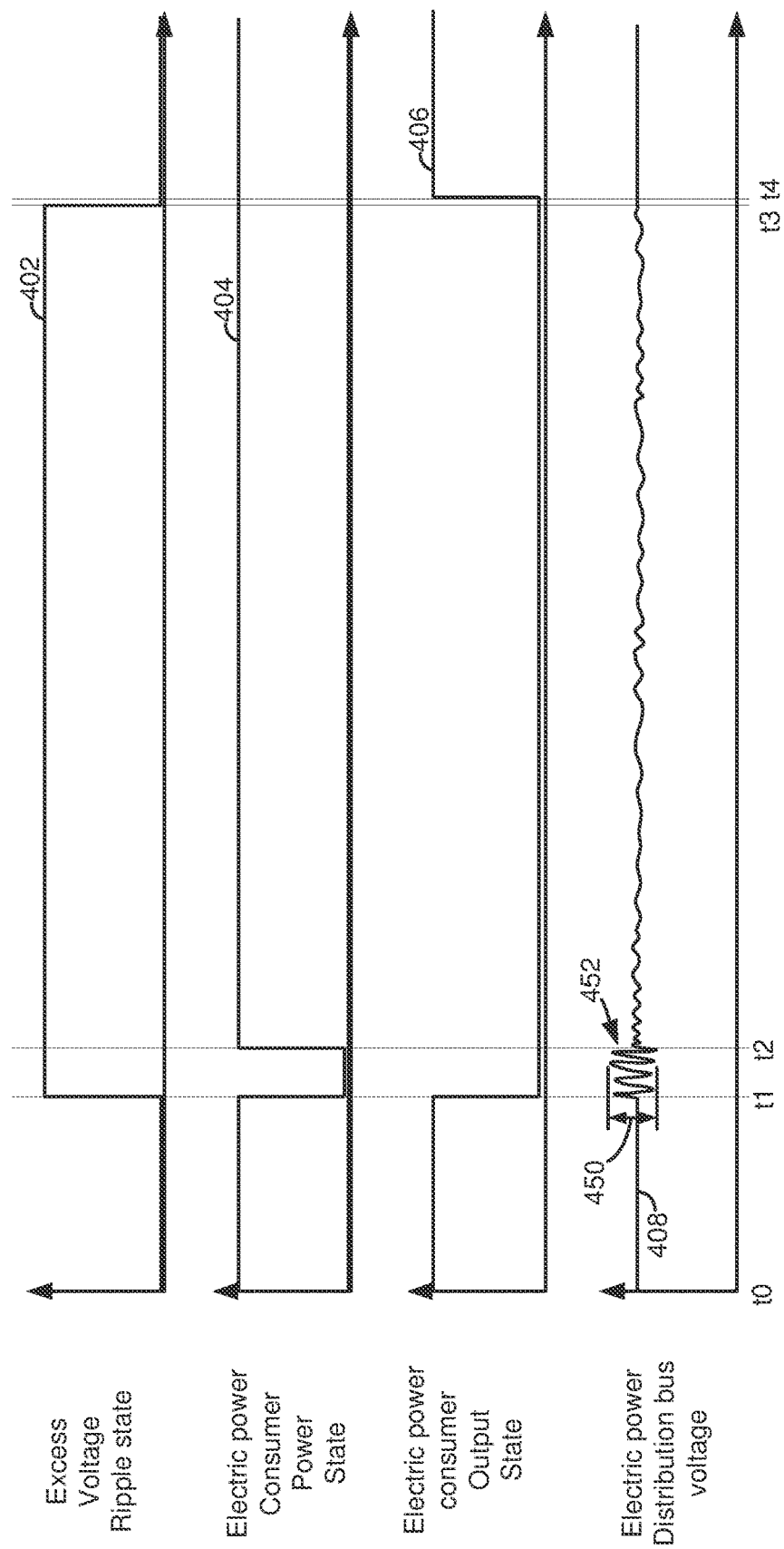
FIG. 4 shows an electric power distribution bus operating sequence according to the method of FIG. 5.
Figure 5:
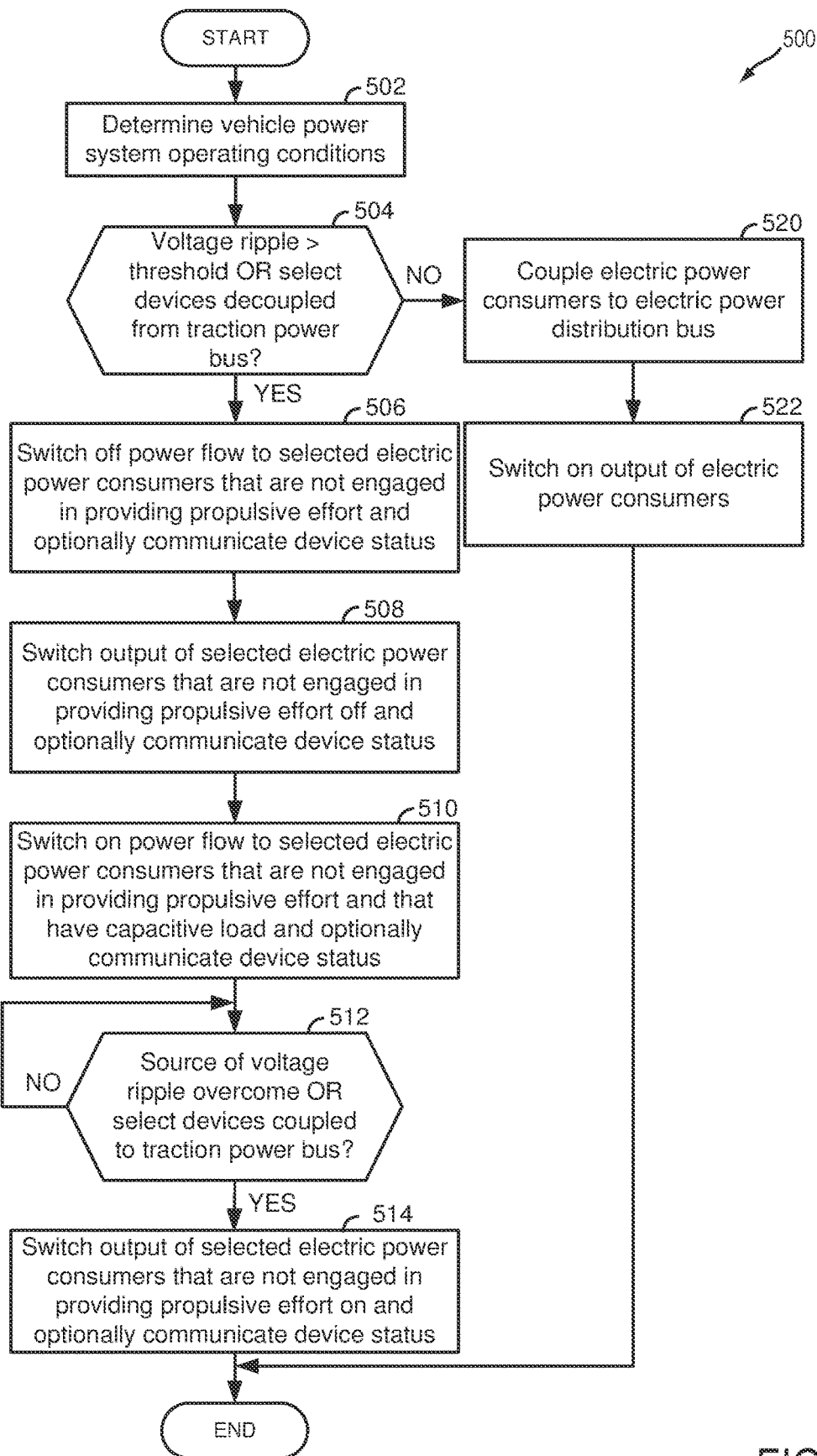
FIG. 5 shows a method for operating an electric power distribution bus of a vehicle.

The present description is related to operating a vehicle's electric power distribution bus. The electric power distribution bus may allow transfer of electric power from a battery to devices, such as electric power consumers. In addition, the electric power bus may deliver electric power to the battery when the battery is being charged. The vehicle that includes the electric power bus may be a hybrid vehicle or an electric vehicle. FIG. 1 shows an engine of an example hybrid vehicle. FIG. 2 shows a powertrain or driveline of a hybrid vehicle. An example direct current (DC) to alternating current (AC) power converter, which represents one type of electric power consumer that may be coupled to the electric power distribution bus, is shown in FIG. 3. An example operating sequence for an electric power distribution bus is shown in FIG. 4. Finally, a flowchart of a method for operating an electric power distribution bus is shown in FIG. 5.

An electric power distribution bus may allow electric power to flow to or from a battery. The battery may have a significant amount of internal capacitance that reduces voltage ripple (e.g., variation of a voltage level from a constant value, such as ±one volt variation from nominal 480 volts) of the electric power that is carried by the electric power distribution bus. The internal capacitance of the battery may contribute a dominant amount of capacitance to the electric power distribution bus. However, if the battery is removed from the electric power bus, voltage ripple of the electric power bus may increase due to the reduction in capacitance that is coupled to the electric power bus. If the voltage ripple is sufficiently high, electric power consumers and devices that are coupled to the electric power distribution bus may degrade (e.g., may not operate as expected or may operate with reduced efficiency). Therefore, it may be desirable to provide a way of reducing voltage ripple of an electric power distribution bus within a vehicle.

The inventors herein have recognized the above-mentioned issues and have developed a method for operating an electric power distribution bus of a vehicle, comprising: coupling an electric power consumer that includes a capacitive input load to the electric power distribution bus in response to voltage ripple of the electric power distribution bus exceeding a threshold level; and decoupling an output of the electric power consumer from other electric power consumers.

By electrically coupling the electric power consumer that includes the capacitive load to the electric power distribution bus, it may be possible to provide the technical result of reducing ripple of voltage transferred via an electric power distribution bus. In particular, the capacitive load may dampen the ripple voltage such that the ripple voltage may be reduced. The reduced ripple voltage may prevent degradation of electric power consumers that are electrically coupled to the electric power distribution bus. In addition, the output of electric power consumer that includes the capacitive load may be decoupled from other electric loads so that voltage of the electric power bus may remain at a desired level.

The present description may provide several advantages. In particular, the approach may reduce a possibility of electric component degradation. Further, the approach may allow some electric power consumers to continue operating. In addition, cost to implement the system and method is low since existing components of the system are utilized to reduce voltage ripple of the electric power distribution bus.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive effort pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes), etc. Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a propulsive effort pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, propulsive effort may be provided to powertrain 200 by engine 10, BISG 219, and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage (e.g., >24 volts) electric power distribution bus 291 and low voltage (e.g., <24 volts) electric power distribution bus 292. High voltage electric power distribution bus 291 is electrically coupled to inverter 246 and traction battery or electric energy storage device 262. Output of electric current and voltage sensors 297 may be supplied to one of the controllers described herein (e.g., 253) to determine operating conditions (e.g., voltage, current, power, temperature, etc.) of high voltage electric power distribution bus 291. High voltage electric power distribution bus 291 may be comprised of metallic bus bars (e.g., copper or aluminum bars) and terminals that allow connection to the high voltage electric power distribution bus 291.

Low voltage electric power distribution bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

Direct current to alternating current (DCAC) converter 249 is an electric power consumer that may supply AC current to receptacles 289. DCAC converter is electrically coupled to electric power distribution bus 291. DCAC converter 249 may receive instructions from controller 12, controller 255, or other controllers via CAN 299. AC power consumers 295 may receive AC power from DCAC converter 249. In addition, additional electric power consumers 239 (e.g., emissions control devices (electrically heated catalysts, air pumps, fuel reformers, etc.), DC/DC converters, DCAC converters, etc.) may be selectively electrically coupled to high voltage electric power distribution bus 291 via internal switches within these devices as shown in FIG. 3.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to increase a speed of vehicle 225, vehicle system controller may obtain a driver demand power or power request from a propulsive effort pedal or other device. Vehicle system controller 255 then allocates a fraction of the requested driver demand power to the engine and the remaining fraction to the ISG or BIS G. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an electric power distribution bus; an traction battery electrically coupled to the electric power distribution bus; a first electric power consumer electrically coupled to the electric power distribution bus; one or more electric power consumers electrically coupled to the first electric power consumer; and a controller including executable instructions stored in non-transitory memory that cause the controller to electrically decouple an output of the first electric power consumer from the one or more electric power consumers in response to voltage ripple of the electric distribution bus exceeding a threshold level. The system includes where the output of the first electric power consumer is electrically decoupled from the one or more electric power consumers via a switch. The system further comprises additional instructions to electrically couple the first electric power consumer to the electric power distribution bus in response to the voltage ripple of the electric distribution bus exceeding the threshold level. The system includes where the one or more electric power consumers are alternating current power consumers. The system includes where the electric power distribution bus transfers electric power between the traction battery and an inverter. The system includes where the electric power distribution bus transfers electric power between the traction battery and a DC/DC converter. The system includes where the electric power distribution bus transfers electric power between the traction battery and first electric power consumer, and where the first electric power consumer is a DCAC converter.

Referring now to FIG. 3, a schematic view of DCAC converter 249 is shown. DCAC converter 249 includes a DC power input 300. The DC power input 300 is electrically coupled to input cut-off switch 302. Input cut-off switch may be a field effect transistor, metal oxide field effect transistor, or other known switching device. Input cut-off switch 302 may selectively allow electrical communication between DC power input 300 and bank of capacitors 304. Capacitors 304 are electrically coupled to input 310 of transformer 305. Output 312 of transformer 305 is input to H-bridge 306 to generate AC power. AC power is supplied to receptacles 289 via DCAC converter output 314. Switch 320 may selectively couple DCAC converter output 314 to receptacles 289 and AC power consumers 295 shown in FIG. 2. Switch 320 may be a field effect transistor, relay contacts, or other known switching device. Control logic 315 may open and close switch 320 according to instructions received via CAN 299.

Referring now to FIG. 4, plots of an example prophetic electric power distribution bus operating sequence according to the method of FIG. 5 is shown. The example sequence may be provided by the system of FIGS. 1 and 2 in cooperation with the method of FIG. 5. The plots are aligned in time and occur at a same time. The vertical lines at t0-t4 indicate times of particular interest in the sequence.

The first plot from the top of FIG. 4 is a plot of a state of excess voltage ripple at the electric power distribution bus versus time. The vertical axis represents state of excess voltage ripple at the electric power distribution bus and there is excess voltage ripple when trace 402 is at a level that is near the horizontal axis arrow. There is not excess voltage ripple when trace 402 is near the horizontal axis. The horizontal axis represents time and the time increases from the left side of the figure to the right side of the figure. Trace 402 represents state of excess voltage ripple at the electric power distribution bus.

The second plot from the top of FIG. 4 is a plot of electric power consumer electric power state versus time. The vertical axis represents electric power consumer electric power state and electric power is applied to the electric power consumer when trace 404 is at a higher level near the vertical axis arrow. Electric power is not applied to the electric power consumer when trace 404 is at a lower level near the vertical axis. The electric power consumers may be electrically powered devices that are electrically coupled to the electric power distribution bus that is coupled to the traction battery. Some of the electric power consumers do not provide torque to the vehicle driveline. Rather, these electric power consumers may include but are not limited to DCAC converters, electric power steering systems, pumps, emissions control devices, etc. The horizontal axis represents time and the time increases from the left side of the figure to the right side of the figure. Trace 404 represents the electric power consumer electric power state.

The third plot from the top of FIG. 4 is a plot of electric power consumer output state versus time. The vertical axis represents electric power consumer output state and output of the electric power consumer is electrically coupled to another electric power consumer when trace 406 is at a higher level near the vertical axis arrow. The electric power consumer output is not electrically coupled to the other electric power consumer when trace 406 is at a lower level near the vertical axis. The horizontal axis represents time and the time increases from the left side of the figure to the right side of the figure. Trace 406 represents the electric power consumer output state.

The fourth plot from the top of FIG. 4 is a plot of voltage of the electric power distribution bus versus time. The vertical axis represents voltage of the electric power distribution bus and the voltage increases in the direction of the vertical axis arrow. The horizontal axis represents time and the time increases from the left side of the figure to the right side of the figure. Trace 408 represents the voltage of the electric power distribution bus versus time. Voltage ripple on the electric power distribution bus is indicated at 452, which shows the amplitude of the voltage increasing and decreasing. The peak to peak voltage of the electric power distribution bus voltage ripple is indicated by the arrow at 450.

At time t0, there is not excess voltage ripple on the high voltage electric power distribution bus (e.g., 291 of FIG. 2) and electric power is being supplied to electric power consumers that are coupled to the high voltage electric power distribution bus. In addition, the outputs of the electric power consumers are coupled to other electric power consumers so that the electrical power consumers may be operated. For example, output of a DCAC converter (first electric power consumer) is coupled to a saw (e.g., second electric power consumer) that is external to the vehicle. Very little voltage ripple is shown at the electric power distribution bus.

At time t1, the excess voltage ripple on the high voltage electric power distribution bus increases to be greater than a threshold as indicated by the excess voltage ripple trace 402 transitioning from a low level to a high level. The excess voltage ripple on the high voltage electric power distribution bus may occur when a traction battery is disconnected from the high voltage electric power distribution bus. The excess voltage ripple may be caused by a reduction in capacitance that is coupled to the high voltage electric power distribution bus.

In addition, electric power is removed from the electric power consumers that are electrically coupled to the high voltage electric power distribution bus as indicated by trace 404 transitioning from a higher level to a lower level. Further, the outputs of the electric power consumers are decoupled from electrical loads as indicated by trace 406 transitioning from a high level to a low level. Decoupling the electrical loads from the electric power consumers may reduce an amount of power that is transferred via the high voltage electric power distribution bus so that voltage carried by the high voltage electric power distribution bus does not fall and so that the electric load on the high voltage electric power distribution bus may be reduced. The voltage ripple is shown increasing significantly at time t1.

At time t2, electric power is once again supplied to the electric power consumers that are electrically coupled to the high voltage electric power distribution bus as indicated by trace 404 transitioning from a lower level to a higher level. The outputs of the electric power consumers remain decoupled from electrical power consumers as indicated by trace 406 so that electrical load on the high voltage electric power distribution bus is lowered. By coupling the electric power consumers to the high voltage electric power distribution bus, it may be possible to reduce excess voltage ripple. However, the excess voltage ripple state does not change since underlying conditions for excess voltage ripple remain. In particular, the traction battery (not shown) remains decoupled from the high voltage electric power distribution bus or a source continues to generate voltage ripple. The voltage ripple is reduced at time t2.

At time t3, the excess voltage ripple state changes from the higher level to the lower level to indicate that excess voltage ripple conditions are no longer present. In one example, the traction battery may be electrically coupled to the high voltage electric power distribution bus at time t3 (not shown). Electric power continues to be delivered to the electric power consumers and output of the electric power consumers remains decoupled from electric power consumers. The voltage ripple is reduced significantly at time t3.

At time t4, the excess voltage ripple is not present, electrical power is supplied to the electric power consumers, and outputs of the electric power consumers are electrically coupled to other electric power consumers. The outputs of the electric power consumers may be coupled to other electric power consumers in response to elimination of the excess voltage ripple state.

Referring now to FIG. 5, a flow chart of a method for operating an electric power distribution bus is shown. The method of FIG. 5 may be incorporated into and may cooperate with the system of FIGS. 1-2. Further, at least portions of the method of FIG. 5 may be incorporated as executable instructions stored in non-transitory memory while other portions of the method may be performed via a controller transforming operating states of devices and actuators in the physical world. The executable instructions stored in non-transitory memory may be updated via over-the-air updates (e.g., via a satellite or a cellular network).

At 502, method 500 determines vehicle power system operating conditions. In one example, method 500 determines a ripple voltage of a high voltage electric power distribution bus via measuring voltage of the high voltage electric power distribution bus. Method 500 may also determine if the traction battery is electrically coupled to the high voltage electric power distribution bus. In addition, method 500 may determine if outputs of electric power consumers that are electrically coupled to the high voltage electric power distribution bus are electrically coupled to or uncoupled from other electric power consumers. Method 500 proceeds to 504 after determining vehicle power system operating conditions.

At 504, method 500 judges if the ripple voltage (e.g., a varying portion of the voltage at the high voltage electric power distribution bus) is greater than a threshold level (e.g., 2 volts peak-to-peak of the time-varying portion of the voltage at the high voltage electric power distribution bus) or if a traction battery or other battery has been decoupled from the high voltage electric power distribution bus. If so, the answer is yes and method 500 proceeds to 506. Otherwise, the answer is no and method 500 proceeds to 520.

At 520, method 500 electrically couples electric power consumers to the high voltage electric power distribution bus. For example, method 500 may close cut-off switch 302 to couple DCAC converter 249 to the high voltage electric power distribution bus. By coupling the electric power consumers to the high voltage electric power distribution bus, the electric power consumers may be activated. Method 500 proceeds to 522.

At 522, method 500 activates output circuits of electric power consumers so that the electric power consumers may power other electric power consumers. In one example, method 500 may close switch 320 to activate the output of DCAC converter 249, or alternatively, switches on a primary side or a secondary side of a coil or transformer in the DCAC may be activated. Likewise, method 500 may activate outputs of other electric power consumers. Method 500 proceeds to exit.

At 506, method 500 switches off electric power flow to selected electric power consumers that are not engaged in providing propulsive effort to the vehicle driveline or powertrain. For example, method 500 may decouple a DCAC converter from the high voltage electric power distribution bus while allowing an inverter that is coupled to an electric machine that delivers torque to the driveline to remain electrically coupled to the high voltage electric power distribution bus. In addition, method 500 may keep a DCDC converter that supplies electric power to a power steering system, a low voltage battery, and other devices coupled to the high voltage electric power distribution bus. In some embodiments, step 506 may be optional.

Method 500 may also communicate which devices are electrically coupled to the high voltage electric power distribution device and/or which devices have been electrically decoupled from the high voltage electric power distribution bus to vehicle occupants and/or a remote device such as a server at a vehicle service center. Method 500 may communicate the device status to vehicle occupants via human/machine interface 11. Method 500 proceeds to 508.

At 508, method 500 switches off outputs of selected electric power consumers that are not engaged in providing propulsive effort to the driveline. By switching off outputs of selected electric power consumers, it may be possible for the vehicle to generate propulsive effort. In one example, switches may be opened to decouple outputs of the selected electric power consumers from electric power consumers. For example, switch 320 may be opened to decouple the DCAC converter 249 from receptacles 289 and electric power consumers 295. In other examples, outputs of devices may be deactivated so that electric power is not supplied to downstream electric power consumers (e.g., electric power consumers that may receive electric power from the device having the deactivated output). The outputs of such devices may be deactivated via deactivating switches of an H-bridge or switches that selectively supply electric power to an inductor or transformer.

Method 500 may also communicate to vehicle occupants and/or a remote device, such as a server at a vehicle service center, which of the selected electric power consumers that are not engaged in providing propulsive effort to the driveline and that has their output switched off. Method 500 may communicate the status of device outputs to vehicle occupants via human/machine interface 11. Method 500 proceeds to 510.

At 510, method 500 switches on electric power flow to one or more selected electric power consumers that are not providing propulsive effort to the powertrain and that include capacitive input loads (e.g., a bank of capacitors). By closing switches that electrically couple the selected electric power consumers to the high voltage electric power distribution bus, it may be possible to reduce ripple voltage of the high voltage electric power distribution bus. In particular, capacitive loads of the selected electric power consumers may reduce ripple voltage of the high voltage electric power distribution bus, especially since the selected electric power consumers are not supplying electric power to other electric power consumers. For example, switch 302 may be closed to electrically couple the DCAC to the high voltage electric power distribution bus. Method 500 may also communicate to vehicle occupants and/or a remote device, such as a server at a vehicle service center, which of the selected electric power consumers that are not engaged in providing propulsive effort to the driveline are electrically coupled to the high voltage electric power distribution bus. Method 500 may communicate the status of devices that are electrically coupled to the high voltage electric power distribution bus to vehicle occupants via human/machine interface 11. Method 500 proceeds to 512.

At 512, method 500 judges if the source of ripple voltage of the high voltage electric power distribution bus is overcome or if select devices are electrically coupled to the high voltage electric power distribution bus. For example, if the source of the ripple voltage is a device that induces switching noise on the high voltage electric power distribution bus and the device has been decoupled from the high voltage electric power distribution bus, then method 500 may judge that the source of the ripple voltage of the high voltage electric power distribution bus has been overcome. Alternatively, if a traction battery were decoupled from the high voltage electric energy power distribution bus and then recoupled to the high voltage electric energy power distribution bus, method 500 may judge that the ripple of the high voltage electric power distribution bus has been reduced via the capacitance of the traction battery. If method 500 judges that the source of ripple voltage of the high voltage electric power distribution bus overcome or that select devices are electrically coupled to the high voltage electric power distribution bus, the answer is yes and method 500 proceeds to 514. Otherwise, the answer is no and method 500 returns to 512.

At 514, method 500 switches on outputs of selected electric power consumers that are not engaged in providing propulsive effort to the driveline. In one example, switches may be closed to couple outputs of the selected electric power consumers to electric power consumers. For example, switch 320 may be closed to couple the DCAC converter 249 to receptacles 289 and electric power consumers 295.

Method 500 may also communicate to vehicle occupants and/or a remote device, such as a server at a vehicle service center, which of the selected electric power consumers that are not engaged in providing propulsive effort to the driveline have their outputs switch on. Method 500 may communicate the status of devices that have their outputs switched on to vehicle occupants via human/machine interface 11. Method 500 proceeds to exit.

In this way, it may be possible to reduce ripple voltage of a high voltage electric power distribution bus. Reducing ripple voltage may reduce a possibility of degrading devices that are electrically coupled to the high voltage electric power distribution bus. In addition, while the method discussed herein describes high voltage electric power distribution buses, the method may also be applied to low voltage and other electric power distribution buses. Thus, devices that include capacitance may be coupled to an electric power distribution bus when a ripple voltage of the electric power distribution bus exceeds a threshold level.

Thus, the method of FIG. 5 provides for a method for operating an electric power distribution bus of a vehicle, comprising: electrically coupling a device (e.g., an electric power consumer) that includes a capacitive input load to the electric power distribution bus in response to voltage ripple of the electric power distribution bus exceeding a threshold level; and electrically decoupling an output of the device from other devices (e.g., electric power consumers). The method includes where the other electric power consumers include alternating current power consumers. The method includes where the electric power consumer is a direct current to alternating current converter. The method includes where the output of the electric power consumer is electrically decoupled from the other electric power consumers via a switch. The method further comprises inferring that the voltage ripple of the electric power distribution bus exceeds the threshold when a traction battery is decoupled from the electric power distribution bus. The method further comprises decoupling a traction battery from the electric power distribution bus. The method further comprises supplying electric power from a traction battery to an electric machine via the electric power distribution bus, and propelling the vehicle via the electric machine. The method further comprises coupling the output of the electric power consumer to the other electric power consumers when the voltage ripple of the electric power distribution bus is less than the threshold level.

The method of FIG. 5 also provides for a method for operating an electric power distribution bus of a vehicle, comprising: electrically decoupling an electric power consumer that includes a capacitive input load from the electric power distribution bus in response to a voltage ripple of the electric power distribution bus exceeding a threshold; electrically decoupling an output of the electric power consumer from other electric power consumers; and electrically coupling an electric power consumer that includes a capacitive input load to the electric power distribution bus after decoupling the output of the electric power consumer from the other electric power consumers. The method includes where the output of the electric power consumer is decoupled from the other electric power consumers via a switch. The method includes where the electric power consumer is a DCAC converter. The method includes where the other electric power consumers consume AC power. The method includes where the voltage ripple occurs when a traction battery is decoupled from the electric power distribution bus.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an electric power distribution bus of a vehicle, comprising:
   electrically coupling a device that includes a capacitive input load to the electric power distribution bus in response to voltage ripple of the electric power distribution bus exceeding a threshold level; and
   electrically decoupling an output of the device from other devices.

2. The method of claim 1, where the other devices include alternating current power consumers.

3. The method of claim 1, where the device is a direct current to alternating current converter.

4. The method of claim 1, where the output of the device is electrically decoupled from the other devices via a switch.

5. The method of claim 1, further comprising inferring that the voltage ripple of the electric power distribution bus exceeds the threshold when a traction battery is decoupled from the electric power distribution bus.

6. The method of claim 1, further comprising decoupling a traction battery from the electric power distribution bus.

7. The method of claim 1, further comprising supplying electric power from a traction battery to an electric machine via the electric power distribution bus, and propelling the vehicle via the electric machine.

8. The method of claim 7, further comprising coupling the output of the device to the other devices when the voltage ripple of the electric power distribution bus is less than the threshold level.

9. A system, comprising:
   an electric power distribution bus;
   a traction battery electrically coupled to the electric power distribution bus;
   a first device electrically coupled to the electric power distribution bus;
   one or more devices electrically coupled to the first device; and
   a controller including executable instructions stored in non-transitory memory that cause the controller to electrically decouple an output of the first device from the one or more devices in response to voltage ripple of the electric power distribution bus exceeding a threshold level.

10. The system of claim 9, where the output of the first device is electrically decoupled from the one or more devices via a switch.

11. The system of claim 9, further comprising additional instructions to electrically couple the first device to the electric power distribution bus in response to the voltage ripple of the electric power distribution bus exceeding the threshold level.

12. The system of claim 9, where the one or more devices are alternating current power consumers.

13. The system of claim 9, where the electric power distribution bus transfers electric power between the traction battery and an inverter.

14. The system of claim 9, where the electric power distribution bus transfers electric power between the traction battery and a DC/DC converter.

15. The system of claim 9, where the electric power distribution bus transfers electric power between the traction battery and the first device, and where the first device is a DCAC converter.

16. A method for operating an electric power distribution bus of a vehicle, comprising:
   electrically decoupling a device that includes a capacitive input load from the electric power distribution bus in response to a voltage ripple of the electric power distribution bus exceeding a threshold;
   electrically decoupling an output of the device that includes a capacitive input load from other devices; and
   electrically coupling the device that includes the capacitive input load to the electric power distribution bus after decoupling the output of the device that includes a capacitive input load from the other devices.

17. The method of claim 16, where the output of the device that includes the capacitive input load is decoupled from the other devices via a switch.

18. The method of claim 17, where the device that includes the capacitive input load is a DCAC converter.

19. The method of claim 18, where the other devices consume AC power.

20. The method of claim 16, where the voltage ripple exceeds the threshold when a traction battery is decoupled from the electric power distribution bus.

* * * * *